WALLACE L. IKARD
KAY N. BURNS       INVENTORS

BY John D. Gassett
ATTORNEY

Aug. 31, 1965
W. L. IKARD ETAL
3,204,246
SEISMIC TRANSCRIBING SYSTEM
Filed April 20, 1962
2 Sheets-Sheet 2
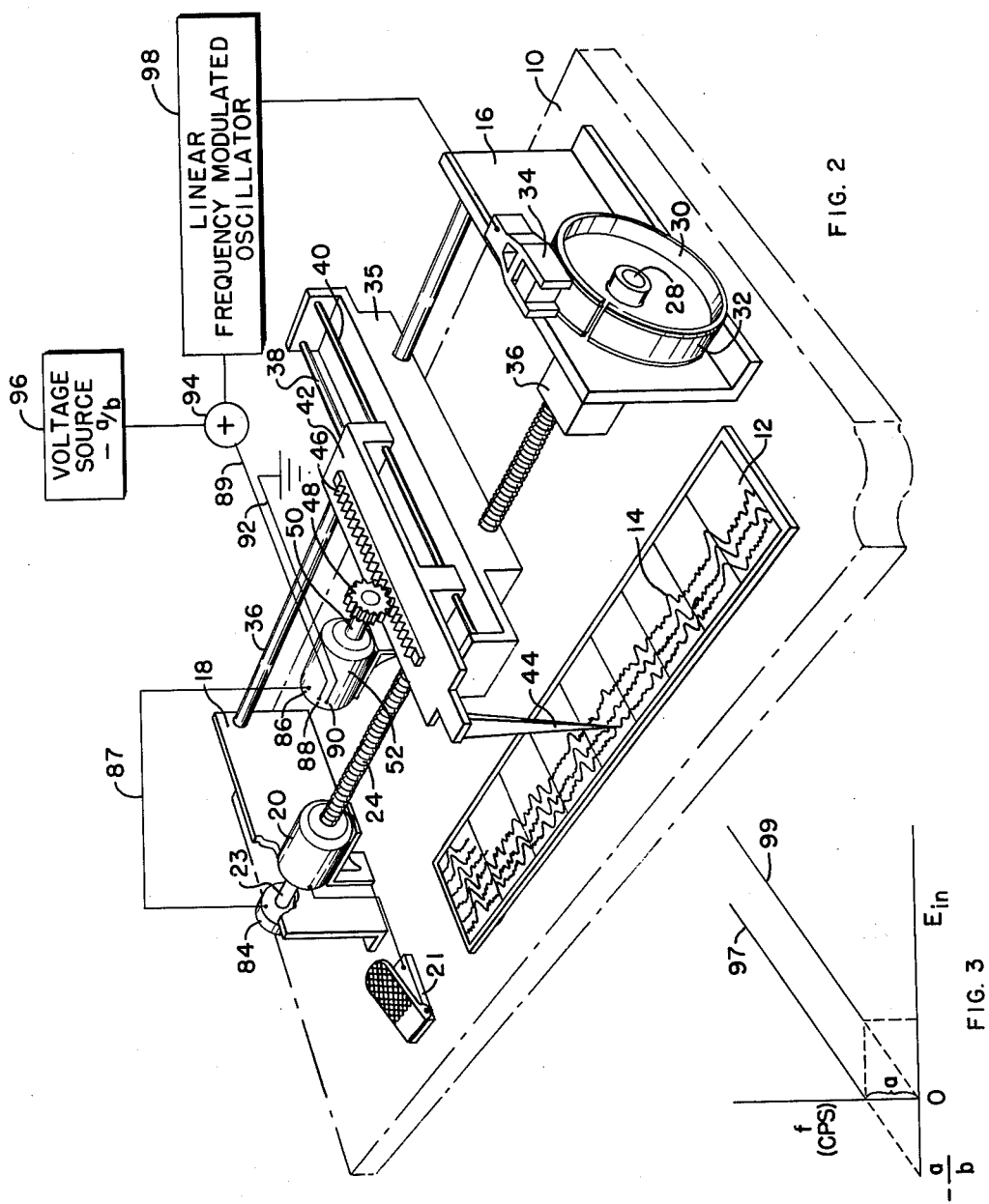
WALLACE L. IKARD
KAY N. BURNS   INVENTOR.
BY *John D. Gassett*
ATTORNEY

United States Patent Office 3,204,246
Patented Aug. 31, 1965

3,204,246
SEISMIC TRANSCRIBING SYSTEM
Wallace L. Ikard and Kay N. Burns, Tulsa, Okla., assignors, by mesne assignments, to Esso Production Research Company, Houston, Tex., a corporation of Delaware
Filed Apr. 20, 1962, Ser. No. 189,083
7 Claims. (Cl. 346—33)

This invention relates generally to the art of geophysical exploration systems using artificial seismic waves or disturbance. It is particularly concerned with a system of recording seismic signals in the form of reproducible traces.

Geophysical prospecting using artificially induced seismic disturbances has found wide application in the search for petroleum and other products. It is the general practice to initiate a seismic disturbance at a point near the surface of the earth to direct seismic waves downward into the earth from that point. The waves continue to travel downwardly within the earth until they encounter discontinuities in the earth's structure in the form of various substrata formations and the like. These discontinuities have the effect of reflecting at least a portion of the seismic waves back toward the surface of the earth. By arranging a plurality of geophones or other seismic transducers at spaced distances from the seismic disturbance point, it is possible to detect the arrival of the reflected seismic waves at the surface of the earth. These detected waves are translated into electrical impulses which are then indicative of the character of the ground motion and are usually referred to collectively as a seismic signal. The seismic signal is in effect a composite signal made up of a plurality of electrical signals varying in frequency and amplitude.

Originally seismograph traces were usually oscillographic-type traces, frequently called "wiggly-traces," formed by the action of a recording pen or a beam of light on suitable recording paper or photographic film. More recently however it has become an increasing practice to record seismic detector signals in the form of reproducible traces such as on magnetic recording tape.

Reproducible traces have become especially desirable, since equipment and methods are now available for automatically reproducing, correcting, correlating and re-recording such traces in the form of seismic sections. A seismic section is a plurality of traces arranged in a side-by-side relationship which forms in effect a cross-section of the earth's surface under consideration. Indeed, seismograms containing reproducible trace information possess so many desirable features that it has been found advantageous to convert the visual non-reproducible oscillographic-type trace seismic records into the reproducible type.

Magnetic tape recording in its simplest form is done by magnetizing the recording medium with an intensity proportional to signal amplitude. This type of recording, sometimes called "direct recording," is satisfactory for many purposes, such as voice and music reproduction. However, where high precision is required, particularly at the low frequencies involved in seismic work, it is common to record the information as a modulation of some higher frequency "carrier" signal. In one such system, the frequency of the carrier signal is varied in direct proportion to the amplitude of the seismic signal. It will be recognized that the relative speed of tape to head motion must remain constant in normal recording or playing black of a frequency modulated carrier signal. Speed variations during recording or playback will result in apparent changes in carrier frequency during playback which will be erroneously interpreted as changes in amplitude of the original input data. Therefore, it will be recognized that variations in the relative velocity between the recording medium and the recording head may have a serious effect upon the fidelity of the information recorded. This is true whether the seismic signal is an original signal recorded directly from the seismic detector or whether it is a reproduced signal obtained by playing back and re-recording previously recorded information. Generally speaking the problem is not a very serious one in recording original signals or in recording reproduced signals obtained by playing back reproducible seismograms, since equipment and methods for processing such signals may be made substantially constant in speed. The problem, however, can be quite serious in re-recording seismic signals that are obtained by translating visible non-reproducible oscillographic or "wiggly-trace" seismograms into reproducible seismograms. "Wiggly-trace" records are sinusoidal in appearance and they frequently overlap one another with the result that methods and apparatus for reproducing such traces cannot conveniently be made to be constant in their rate of scan along the longitudinal length of the traces. Thus it generally takes much more time and care to scan along an involved portion of an oscillographic trace than it does along a relatively simple portion of a trace. It is frequently advantageous to take more time with the complex portion of such traces since these portions are frequently the portion of real interest in the trace.

It is one object of this invention to provide a system for transcribing conventional "wiggly-trace" or oscillographic trace records to frequency modulated magnetic tape records wherein variation in the rate of scanning along the length of the trace has no effect upon the fidelity of the record.

Briefly in a preferred embodiment the invention includes a scanning means which has both longitudinal movement along the trace and lateral movement to follow the amplitude variations of the trace. A pulse generating means which has an output of sharp pulses is provided. Control means are provided to control the rate of output of the pulse generating means directly proportional to the variations in the speed of longitudinal movement of the scanning means. A recording medium is provided which moves by a recording head at a speed likewise proportional to the speed of the longitudinal movement of the scanning means. The recording head is electrically connected to the output of the pulse generating means. The output of the pulse generating means is further modulated by the lateral movements of the scanning means. Thus the signal recorded on the recording means is of high fidelity and is not influenced at all by the varying rates of the longitudinal movement of the scanning means.

Other objects and a better understanding of the invention can be had from the following description taken in conjunction with the drawings in which:

FIG. 2 is a schematic view of another embodiment of the invention; and,

FIG. 3 illustrates a frequency V input voltage characteristic and a modified characteristic of a common type oscillator.

Figure 1:
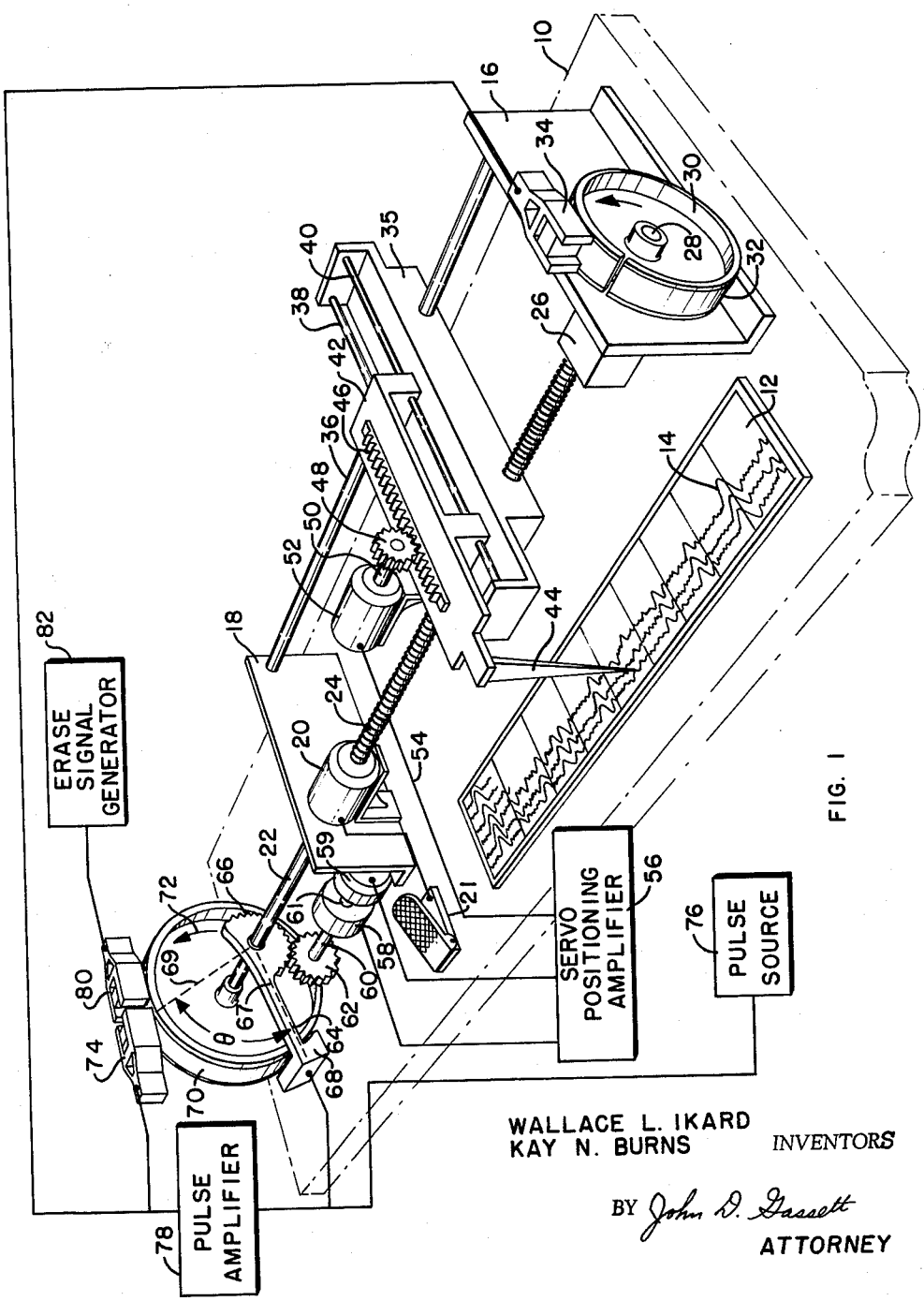
FIG. 1 is a schematic view of an apparatus embodying the principles of the invention which is of a character to transcribe "wiggly-traces" onto a magnetic recording medium in frequency modulated form.

In FIG. 1 of the drawing there is illustrated a base plate 10 upon which is mounted a seismic record 12 comprising a plurailty of oscillographic or "wiggly-traces" 14. Also mounted on plate 10 is a first upright support 16 and a second upright support 18 which is spaced from the first upright support 16. Mounted on upright support 18 is a variable speed motor 20 which has a first shaft 22 and a second shaft 24 which is threaded. The speed of motor 20 is controlled by a speed control means 21 similar to the variable speed control means on sewing machines, for example. Threaded shaft 24 extends to gear box 26 which is supported from upright support 16. Output shaft 28 of gear box 26 extends through upright member 16. Mounted upon shaft 28 is a recording or record drum 30 which has mounted thereon a recording medium 32 and a recording head 34 which is arranged and of a character to record upon the recording medium 32.

Attention will now be directed to that portion of FIG. 1 which is used for scanning the oscillographic traces on the record 12. This includes a lower carriage 35 which is threadedly mounted on shaft 24 and slidably mounted on longitudinal bar 36. Longitudinal bar 36 is supported from upright supports 16 and 18. Lower carriage 35 has internal threads which match the external threads of shaft 24 and thus upon rotation of shaft 24, is caused to move longitudinally along shaft 24. Transverse bars 38 and 40 are mounted above and supported from lower carriage 35. Slidably supported upon transverse bars 38 and 40 is upper carriage or transverse carriage 42. A stylus 44 is supported from upper carriage 42. Upper carriage 42 is readily slidable along transverse bars 38 and 40 so that stylus 44 can be caused to follow the "wiggly-trace" record being transcribed as the scanning means moves longitudinally along the record. While it is possible to provide means for enabling stylus 44 to automatically follow along the trace on seismogram 12, it will be assumed in the present description that stylus 44 is actuated in its lateral movement manually.

Shaft 24 can be a self-reversing type assembly, for example like the self-reversing screws that are used in fishing reels. Thus when the lower carriage 44 reaches one end of the shaft, it may reverse automatically and return to the opposite end of the screw.

A rack 46 is mounted on the upper carriage 42, and a pinion gear 48 and its shaft 50 are supported so that lateral movement of upper carriage 42 causes the pinion to rotate relative to the rack. Shaft 50 is connected to a non-linear potentiometer 52 which is supported from lower carriage 35. Thus lateral movement of stylus 44 moves rack 42, which rotates pinion 48 causing potentiometer 52 to have an output which is a function of the lateral movement of stylus 44.

Attention will now be directed toward that part of FIG. 1 which provides a frequency modulated signal which is recorded by recording head 34 and which signal takes into account both the lateral movement of stylus 44 and the rate of longitudinal movement of the scanning means. The nature and purpose of the non-linear potentiometer 52 will be explained further hereinafter. The output of potentiometer 52 is fed through conductor 54 to servo amplifier 56. The output of servo amplifier 56 is fed to servo receiver motor 58 which has an output shaft 60 upon which is mounted a geared wheel 62. Potentiometer 59 is driven by shaft 61 from servo receiver motor 58. The output from potentiometer 59 is fed to servo positioning amplifier 56 where it is compared to the output of potentiometer 52 in a conventional manner. It will be understood that the non-linearity compensated for in potentiometer 52 can instead be compensated for in potentiometer 59. Rotatably mounted on shaft 22 is reproducing head arm support 64 which has arcuate gears 66 which mesh with gears 62. On the outer end of arm 64 is reproducing head 68 which is of a character and arranged such as to reproduce the signal which is recorded on recording medium 70 which is mounted on drum 72. Drum 72 is mounted on shaft 22 and rotates with shaft 22. A recording head 74 is supported so as to record upon magnetic recording medium 70.

A pulse source 76 is connected to a pulse amplifier 78 whose output is connected to recording head 74 of pulse regenerating drum 72. Pulse source 76 is of a character to have an output of a single sharp pulse upon command, such as by manual operation. Reproducing head 68 is connected to pulse amplifier 78. The output of pulse amplifier 78, in addition to being fed to recording head 74 of pulse producing drum 72, is also connected to recording head 34 of record drum 30. Erase head 80 is provided to erase the signal from recording medium 70 after it has been reproduced and is arranged so that recording medium 70 is "clean" by the time it again passes under recording head 74. An erase generator 82 is connected to erase head 80.

A brief discussion of the operation of FIG. 1 will now be given. Stylus 44 is preferably positioned on the zero reference line of its trace which is to be translated and carriage 35 is positioned at the left end of record 12 which prefrably corresponds to the shallow end of the record. Arm 64 is positioned at about half-way between $\theta_1$ and $\theta_2$ in which $\theta$ represents an angle whose vertex is the center of shaft 22, and its two legs are arm 64 represented by a dotted line 67, and the other side is represented by dotted line 69 which extends from the center of shaft 22 to recording head 74. Lines 69 and 67 lie in a plane perpendicular to shaft 22. $\theta_1$ represents the smallest angle $\theta$ for the positive value of the signal being transcribed and $\theta_2$ represents the largest negative value. Pulse source 76 is actuated to emit a pulse which passes through pulse amplifier 78 and is recorded on magnetic recording medium 70 of the pulse producing drum. The trace is now ready to be scanned and transcribed. The operator depresses speed control means 21 which energizes motor 20. The speed of motor 20 can be controlled by the amount which switch 21 is depressed similarly as on a sewing machine. As motor 20 begins to rotate, drum 72 rotates in the direction of the arrow so that the pulse placed by recording head 74 will be reproduced by drum 68 before it is erased by erase head 80 which receives an erase signal from erase signal generator 82. When the pulse which is recorded on magnetic head 70 rotates an angular distance $\theta$, it is reproduced by reproducing head 68 and is passed through pulse amplifier 78 where it is re-recorded on magnetic tape 70 by recording head 74. The reproduced pulse is also recorded on the seismic record recording medium 32 by head 34. Drum 30 is rotated proportional to the speed of the rotation of drum 72. Thus for a given position of stylus 44, which is also a given position for arm 67 (constant $\theta$), the rate of reproduction of the pulse by reproducing head 68 is proportional to the speed of rotation of record drum 30 as the speed of drums 72 and 30 are proportional. Thus, where $\theta$ is constant, it is seen that there is an equal number of pulses recorded on magnetic recording medium 32 for each unit of linear measurement without regard to the speed of rotation.

As shaft 24 rotates, it moves lower carriage 35 longitudinally with respect to the "wiggly-trace" being transcribed. At the same time an operator manually causes stylus 44 to follow the variations of the "wiggly-trace." The lateral movement of stylus 44 causes potentiometer 52 to have an output as a function of such lateral movement. The output of potentiometer 52 passes through servo amplifier 56 to drive servo motor 58 which positions arm 62. It is desired to obtain a linear relationship between stylus 44 displacement and the frequency (for example, pulses per inch on recording on the final record 32). A non-linear potentiometer 52 is provided since the frequency is proportional to the reciprocal of the head spacing angle $\theta$. The frequency of the output from reproducing head 68 is proportional to the reciprocal of the head spacing angle $\theta$, or $1/\theta$. It is desired that the frequency of the output from head 68 be a linear function of the lateral position of stylus 44. Thus potentiometer 52 is selected to have a non-linearity to compensate for the non-linear function $1/\theta$ of the head 68 spacing. The angle $\theta$ then controls the number of pulses per inch recorded on recording medium 32. Thus by properly controlling $\theta$ in response to the lateral movement of stylus 44, a frequency modulated signal is recorded on 32 which is controlled by the amplitude of the signal being transcribed. Further, inasmuch as the rotation of drum 72 and drum 30 are always directly proportional, the speed of longitudinal scanning is unimportant. Thus an operator can spend more time following a curve on the complex portion of the trace and less time on the less complex portion. If the longitudinal component of the scanning is increased, then the rate of reproducing the pulses from recording medium 70 is increased as drum 72 increases, but at the same time the speed of recording medium 32 is increased on the final record. At the same time the position of arm 64 which adjusts reproducing head 68 is positioned according to the lateral variations of stylus 44 so that the angle $\theta$ is always properly adjusted.

Attention is now directed to FIG. 2 which shows another embodiment for converting "wiggly-trace" records to a frequency-modulated recording on a magnetic recording medium. Parts in the drawing of FIG. 2 which correspond to that of FIG. 1 are given the same reference numerals. These include base plate 10, record 12 upon which are "wiggly-traces" 14, upright supports 16 and 18, motor 20 having threaded shaft 24 upon which is mounted under carriage 35, gear box 36, and shaft 28 upon which is mounted drum 30 and its recording head 34. Other corresponding parts include transverse shafts 38 and 40 on under carriage 35 and upon which is mounted upper carriage 42 which supports stylus 44, rack 46 and pinion 48 which is connected to shaft 50 of potentiometer 52. Also included is variable speed control means 21 for motor 20. Shaft 23 extends out the opposite end of motor 20 from shaft 24. Mounted on shaft 23 is a D.-C. tachometer 84 whose output is proportional to and varies linearly with the speed of rotation of motor 20.

Potentiometer 52 is shown to have three external taps 86, 88 and 90. Tap 90 is the ground tap and is ground through conductor 92. Tap 86 is a reference voltage tap and is connected to the output of tachometer 84 through conductor 87. Tap 88 is the output voltage tap and is connected to adding circuit 94 through conductor 89.

Also connected to adding circuit 94 is a voltage source 96 whose output is $-a/b$. The values of $a$ and $b$ will be explained in relation to the linear frequency modulated oscillator 98 to which is fed the output of adding circuit 94. A typical characteristic curve for commercially available linear frequency modulated oscillators is illustrated in FIG. 3 as curve 97. The abscissa is voltage and the ordinate is in frequency. As shown there, as the voltage increases, the frequency of the output of the oscillator likewise increases in a linear manner. However, it is noted that curve 97 does not intercept the zero axis, but at zero voltage input has a frequency of $a$. Expressed mathematically the characteristic of such oscillators is of the general form $f=a+b(E_{in})$. The addition of the voltage $-a/b$ from voltage source 96 has the effect of repositioning the oscillator curve to have a zero frequency intercept with zero volts input. The modified characteristic curve is illustrated as curve 99.

In order to better understand the functioning of the embodiment of FIG. 2 a brief description will now be given of its operation. A magnetic record is placed on drum 30 to receive the modulated signal. "Wigglytrace" record 12 is placed in its proper position on plate 10. Carriage 35 is positioned at the shallow end of record 12. Stylus 44 is set at the zero position of the "wiggly-trace" record to be transcribed. In this embodiment, potentiometer 52 is linear and adjusted so that at the zero position of stylus 44, potentiometer 52 will have its intermediate or selected output. When motor 20 is in "at rest" position, the output from tachometer 84 is zero. Thus as the reference voltage to potentiometer 52 is zero, the output voltage from potentiometer 52 is likewise zero. However, at this point the voltage output from source 96 is set to be $-a/b$. This is added to the output from potentiometer 52 which is zero. Thus the voltage fed to linear frequency modulated oscillator 98 is $-a/b$. Thus the modified characteristic curve 99 is in effect characteristic curve 97 displaced by a reference voltage $-a/b$ obtained from source 96. The lower portion of curve 99 is dotted as oscillators in general do not allow linear operations below minimum input control voltages $E_{min}$.

When it is desired to start the scanning operation, switch 21 is depressed so as to start motor 20 to give longitudinal movement to stylus 44. The rotation of drum 30 and record 32 is always directly proportional to the longitudinal movement of stylus 44 for all varying speeds of motor 20. As a way of explanation, assume that stylus 44 stays at one lateral position. For a first speed of motor 20, the output of tachometer 84 is such that, for the central position of potentiometer 52, oscillator 98 has an output frequency of $f_1$. When the speed of rotation of motor 20 is doubled for example, the output voltage of tachometer 84 is likewise doubled. For the same position of stylus 44 (and potentiometer 52) oscillator 98 has a frequency of $2f_1$ which is recorded by recording head 34 on recording medium 32. However, if motor 20 is going at twice the speed, so is drum 30 and recording medium 32. Thus, although oscillator 98 is putting out a frequency of twice the rate, the recording medium 32 is travelling at twice the rate; thus the number of pulses recorded per unit length of record is the same in either case. Thus the D.-C. tachometer 84 is a direct correction of the speed of longitudinal movement of stylus 44 with respect to record 12.

As the scanning operation commences, stylus 44 will be caused to have lateral movement as by an operator, to follow the trace which is being transcribed. As stylus 44 moves laterally, rack 46 is moved laterally thus rotating pinion 48 and thus changes the position of the variable contact arm of the potentiometer. The lateral position of stylus 44 in effect causes potentiometer 52 to divide the voltage from tachometer 84 as a linear function of the amplitude of the signal being transcribed.

To briefly summarize momentarily, tachometer 84 acts as a first control means to control the frequency output of oscillator 98 according to the longitudinal movement of the scanning means. Potentiometer 52 acts as a second control means to modify the first control means so as to impart a modulation of the oscillator 98 according to the amplitude variations of the signal being transcribed. Thus both the rate of longitudinal scanning and the lateral movement of the scanning means are used to obtain a transcribed frequency modulated signal which is recorded upon record 32.

Nearly all oscillographic traces or "wiggly-traces" have certain sections which overlap and are difficult to follow with stylus 44. During these areas it is desired that the longitudinal speed of the stylus be greatly reduced from a speed during the transcription of other parts of the record. Thus motor 20 is caused to rotate rather slowly in such areas. This can be done easily with the system in FIG. 2 without injecting any error into the final record recorded on medium 32. As shown above, tachometer 84 senses the speed of the longitudinal movement of stylus 44 and this sensing is basically responsible for modifying oscillator 98 to have a frequency output which compensates for any variation in speed of recording medium 32. Potentiometer 52 divides the output voltage from tachometer 84 as a linear function of the position of stylus 44. The voltage $-a/b$ is added to the potentiometer output voltage so as to have the effect of repositioning the oscillator curve to have a zero frequency intercept at zero voltage input. This voltage source 96 is shown inasmuch as most linear frequency modulated oscillators do not have a zero frequency intercept at zero volts input. However, if an oscillator 98 were used that did have a zero frequency intercept with zero volts input, then $a$ would be equal to zero and the output from voltage source 96 would likewise be zero. Stated differently, voltage source 96 would not then be necessary.

While there are above disclosed but a limited number of embodiments of the system of the invention herein presented, it is possible to produce still other embodiments without departing from the inventive concept herein disclosed. It is therefore desired that only such limitations be imposed on the appended claims as are stated therein.

What is claimed is:

1. An apparatus for transcribing conventional "wiggly-trace" seismic records into frequency modulated recording magnetic medium records which comprises: mounting means for holding said "wiggly-trace" seismic records; a magnetizable medium; a magnetic recording head arranged adjacent to said magnetizable medium in a manner to impress a signal thereon; scanning means capable of lateral and longitudinal movement with respect to said mounting means; means to effect relative movement between said magnetic recording head and said medium with said movement being proportional to the longitudinal movement between said scanning means and said mounting means; pulse generating means; first control means for modulation of the rate of pulses generated by said pulse generating means responsive to the rate of longitudinal movement of said scanning means; second control means to modify said first control means to provide further modulation to the rate of pulses of said pulse generating means responsive to the lateral position of said scanning means; and means connecting said recording head with the output of said pulse generating means.

2. An apparatus for transcribing a conventional "wiggly-trace" seismic record into a frequency modulated recording magnetic medium record which comprises: a magnetizable medium; a magnetic recording head; mounting means for said "wiggly-trace" seismic record; scanning means capable of lateral and longitudinal movement with respect to said mounting means; means to effect relative movement between said magnetic recording head and said medium with said movement being proportional to the longitudinal movement between said scanning means and said mounting means; first voltage generating means which has an output control signal proportional to the rate of longitudinal movement of said scanning means; control means electrically connected to the output of said first voltage generating means responsive to the lateral position of said scanning means to produce a modified control signal; a linear frequency modulated oscillator connected to said control means and responsive to said modified control signal; and means for conducting the signal from said oscillator to said recording head.

3. An apparatus for transcribing a conventional "wiggly-trace" seismic record into frequency modulated record which comprises: mounting means for said "wiggly-trace" seismic record; scanning means capable of lateral and longitudinal movement with respect to said mounting means such that said scanning means is operable to follow said "wiggly-trace" seismic records; a recording medium; a magnetic recording head means; means to effect relative movement between said recording head means and said medium with said movement being proportional to the longitudinal movement between said scanning means and said mounting means; a direct current tachometer whose output voltage is proportional to the rate of longitudinal movement of said scanning means; a potentiometer responsive to the lateral movement of said scanning means, the reference voltage tap of said potentiometer being electrically connected to the output of said tachometer; a linear frequency modulated oscillator whose frequency output is linear with respect to its input voltage and whose characteristic curve extrapolates to zero at $-e_1$ input voltage signal; a voltage source having an output voltage of $-e_1$; an adding circuit; first means electrically connecting the output of said potentiometer to said adding circuit; second means electrically connecting the output of said voltage source to said adding means; third means electrically connecting the output of said adding circuit to said linear frequency modulated oscillator; and means for conducting the signal from said oscillator to said recording head.

4. An apparatus for transcribing conventional "wiggly-trace" seismic records to frequency modulated recording medium which comprises: mounting means for said "wiggly-trace" seismic records; scanning means capable of lateral and longitudinal movement with respect to said mounting means such that said scanning means is operable to follow said "wiggly-trace" seismic records; a recording medium; a first magnetic recording head means; means to effect relative movement between said recording head means and said medium with said movement being proportional to the longitudinal movement between said scanning means and said mounting means; a rotatable drum; means to rotate said drum at a rate proportional to the longitudinal movement of said scanning means; a magnetic recording medium mounted about the periphery of said drum; a second magnetic recording head arranged adjacent to said drum in a manner to impress a signal on said recording medium; a reproducing head arranged adjacent to said drum in a manner to reproduce the signal recorded thereon by said recording head; erase means to remove signals from said magnetic recording medium, such erase means being positioned to remove the signal from said medium after it has been reproduced and before it reaches the second recording head; a pulse amplifier; a pulse source capable of generating a single sharp pulse and being electrically connected to the input of said pulse amplifier; means electrically connecting the output of said reproducing head with said pulse amplifier; means for conducting the signal from said pulse amplifier to said second recording head; second means for conducting the signal from said pulse amplifier to said first recording head; and means to adjust the relative position of said playback head with respect to said second recording head according to the lateral position of said scanning means.

5. An apparatus for transcribing conventional "wiggly-trace" seismic records into frequency modulated recording magnetic records which comprises: mounting means for holding said "wiggly-trace" seismic records; a magnetizable medium; a first magnetic recording head means; scanning means capable of lateral and longitudinal movement with respect to said mounting means; means to effect relative movement between said first magnetic recording head means and said medium with said movement being proportional to the longitudinal movement between said scanning means and said mounting means; a second magnetizable medium; a second recording head means to record a pulse on said second magnetizable medium; reproducing means for reproducing the pulse from said second recording medium; means to move said second recording medium from said second recording head means toward said reproducing means and at a speed with respect to said second recording head means which is proportional to the movement of said first recording medium; means to vary the position of said reproducing means with respect to said second recording head means in proportion to the lateral movement of said scanning means; electrical means connecting said reproducing means with said first recording head means; and means to record the pulse from said reproducing head on said second magnetizable medium at a position thereon which is travelling toward said reproducing head.

6. An apparatus for transcribing conventional "wiggly-trace" seismic records into frequency modulated record which comprises: mounting means for holding said "wiggly-trace" seismic record; a recording medium; a first recording head for recording on said first medium; scanning means capable of lateral and longitudinal movement with respect to said mounting means; means to effect relative movement between said first recording head and said first recording medium with said movement being proportional to the longitudinal movement between said scanning means and said mounting means; a rotatable drum; means to rotate said drum proportional to the speed of movement of said first recording medium; a second recording medium mounted on said drum; a second recording head supported adjacent said drum for impressing a signal on said second recording medium; a pulse source; a pulse amplifier electrically connected to said pulse source; means connecting the output of said pulse amplifier to said first and said second recording heads; a reproducing head spaced from said second recording head and arranged to reproduce the pulse recorded on said second recording medium; means connecting the output of said reproducing head with the input to said pulse amplifier; and means to vary the relative position between said second recording head and said reproducing means in accordance with the lateral movement of said scanning means.

7. An apparatus for transcribing an oscillographic-type trace to a frequency modulated record which comprises: scanning means for scanning along the length of the trace, said scanning means having longitudinal and lateral movements for following the amplitude variations of the oscillographic-type trace; generating means for generating discrete pulses; first control means for controlling the frequency of the occurrence of such discrete pulses as a function of the speed of longitudinal movement of said scanning means; second control means to modify said first control means to provide further modulation to the rate of occurrence of such discrete pulses of said generating means responsive to the lateral movement of said scanning means; and recording means for recording the resulting modulated pulses from said generating means.

References Cited by the Examiner
UNITED STATES PATENTS

| | | | |
|---|---|---|---|
| 2,986,722 | 5/61 | Williams | 340—15.5 |
| 3,040,320 | 6/62 | Ikard | 346—33 |
| 3,040,321 | 6/62 | Ikard | 346—30 |
| 3,041,610 | 6/62 | Hibbard | 346—33 |
| 3,047,836 | 7/62 | Johnson et al. | 340—15.5 |
| 3,048,846 | 8/62 | Martin | 346—1 |
| 3,050,731 | 8/62 | Usdin | 346—1 |

LEYLAND M. MARTIN, *Primary Examiner.*

LEO SMILOW, *Examiner.*